T. T. GRASER.
KETTLE.
APPLICATION FILED JUNE 10, 1918.
1,297,678.
Patented Mar. 18, 1919.
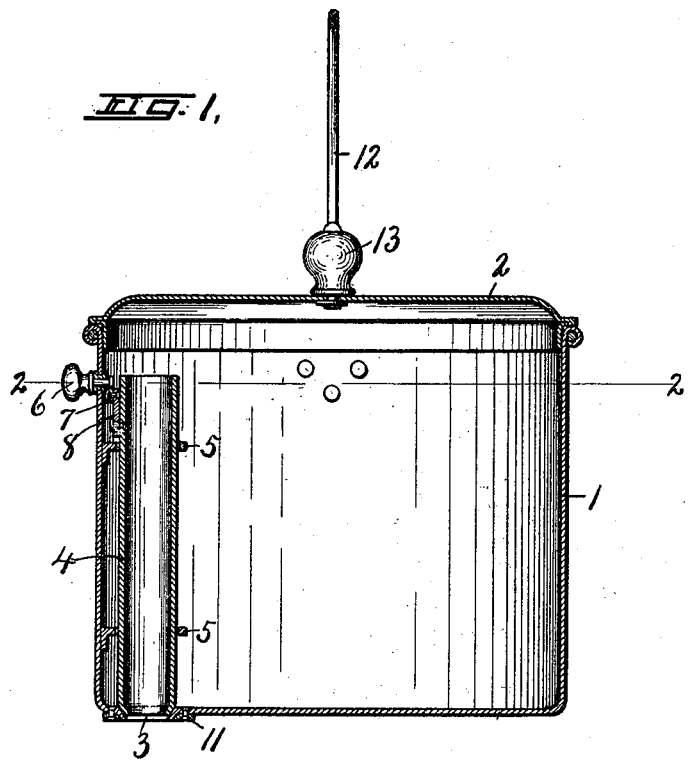
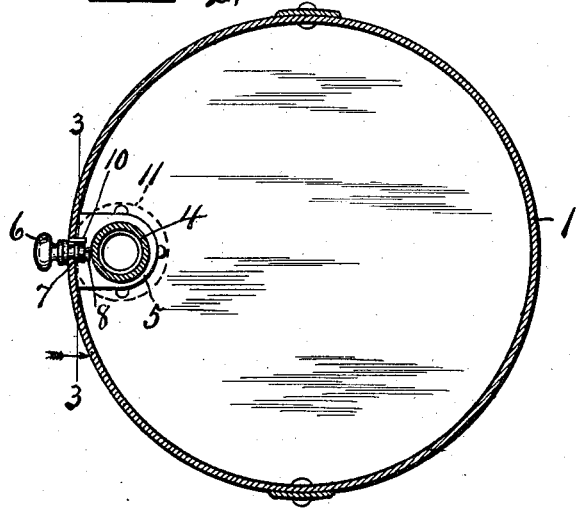
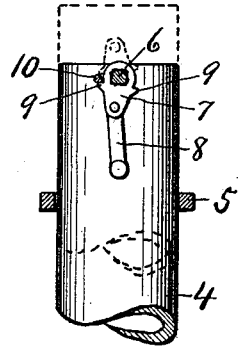
INVENTOR
Thomas T. Graser
BY Howard P. Denison
ATTORNEY.

UNITED STATES PATENT OFFICE.

THOMAS T. GRASER, OF SYRACUSE, NEW YORK.

KETTLE.

1,297,678.  Specification of Letters Patent.  Patented Mar. 18, 1919.

Application filed June 10, 1918. Serial No. 239,132.

*To all whom it may concern:*

Be it known that I, THOMAS T. GRASER, a citizen of the United States of America, and resident of Syracuse, New York, in the county of Onondaga, in the State of New York, have invented new and useful Improvements in Kettles, of which the following, taken in connection with the accompanying drawings, is a full, clear, and exact description.

This invention relates to certain improvements in kettles adapted to receive water or other liquids for boiling and cooking purposes or other uses to which a device of this character might be put.

This receptacle is usually provided with a cover or lid which is closed during the boiling or cooking operation and the broad object of my present invention is to provide simple means whereby the steam and vapor may readily escape invisibly into the combustion chamber of the heater through a suitable outlet in the bottom of the receptacle and to utilize the same venting means as a valve for controlling the exit of the liquid when desired without tilting or inverting the kettle or removing the cover therefrom.

In other words I have sought to release the accumulating steam or vapor and to control the discharge of the liquid through one and the same outlet by means of a vent tube normally seated in the outlet and adapted to be opened at will to discharge the liquid contents.

Other objects and uses relating to specific parts of the device will be brought out in the following description:—

In the drawings—

Figure —1— is a central vertical sectional view of a kettle embodying the various features of my invention.

Fig. —2— is a horizontal sectional view taken on line 2—2 Fig. —1—.

Fig. —3— is an enlarged vertical sectional fragmentary view taken in the plane of line 3—3 Fig. —2—.

The receptacle may be made of any suitable form, size or material and comprises a main body —1— and a cover —2—, the bottom of the main body being provided with an outlet —3— preferably near one side and normally closed by a vertically movable vent tube —4— wholly within the main body —1— between the bottom thereof and the cover —2—.

The vent tube —4— is preferably disposed in a vertical position parallel with the axis of the main body —1— and extending from the bottom some distance above the normally level of the liquid or to a point in proximity to and just below the cover —2—, said tube being open from end to end and having its lower end slightly contracted or conical to form a valve which is normally seated in the outlet —3— to prevent the discharge of the liquid until lifted from its seat in a manner hereinafter described.

Projecting inwardly from the adjacent side of the main body —1— of the receptacle are suitable lugs —5— spaced apart, one above the other and provided with apertures or openings in which the tube —4— is movable to guide said tube during its movement and to properly register its lower end with the outlet —3— when the tube is lowered to close said outlet.

Any suitable means may be provided for raising and lowering the tube at will, said means consisting in this instance of a rotary hand piece —6— journaled in the adjacent side of the main body —1— near the upper end of the tube —4— and having its inner end provided with a crank-arm —7—. A link —8— is pivotally connected at one end to the crank arm —7— and at its other end to the tube —4— in such manner as to produce a toggle for locking the tube in its open or closed position by simply turning the knob —6— which is located on the exterior of the main body —1—.

If desired the crank-arm —7— may be provided with stop shoulders —9— for engaging a pin 10— to limit the rotary movement of the hand piece —6— when moving the tube —4— from one extreme position to another and causing said tube to be held in either position.

The portion of the bottom of the kettle surrounding the outlet —3— is preferably depressed to form a conical seat for the lower end of the tube —4— and is, in turn, surrounded by a reinforcing ring —11— of steel or equivalent material to prevent excessive wear or impairment of the valve seat as the kettle is moved across and upon the surface of the heater or other support.

The kettle —1— is provided with the usual bail or handle —12— by which it may be carried from place to place while the lid or cover —2— is provided with a handle —13— by which it may be removed and replaced when necessary.

When the kettle is being used for boiling or cooking purposes, the steam or vapor may readily escape through the tube —4— and outlet —3— into the combustion chamber over which the kettle is supported, and when it is desired to remove the liquid, the kettle may be removed from the heater or its outlet registered with any suitable drainage receptacle whereupon the hand-piece —6— may be turned to raise the tube from its seat and allow said liquid to escape through the outlet without tilting the kettle or removing the lid, the reverse operation of the hand-piece serving to return the tube to its closed position to close the outlet.

What I claim is:

1. A covered kettle having an outlet in its bottom, a vent tube wholly within the kettle and normally seated in the outlet to prevent the escape of liquid and permit the escape of steam and vapor, and means for lifting the tube from the outlet to permit the escape of the liquid without removing the cover or tilting the kettle.

2. A covered kettle having an outlet in its bottom, a vent-tube having its lower end normally seated in the outlet to form a liquid tight joint with the seat and its upper end extended above the liquid level, and means operable at will for lifting the tube from its seat.

In witness whereof I have hereunto set my hand this 8th day of June, 1918.

THOMAS T. GRASER.

Witnesses:
H. E. CHASE,
FRANK M. MAWHINNEY.

Copies of this patent may be obtained for five cents each, by addressing the "Commissioner of Patents, Washington, D. C."